Dec. 12, 1933.　　　　　H. BERNARD　　　　1,938,796
GEAR SHIFTING MECHANISM FOR MOTOR VEHICLES
Filed June 10, 1932　　　2 Sheets-Sheet 1
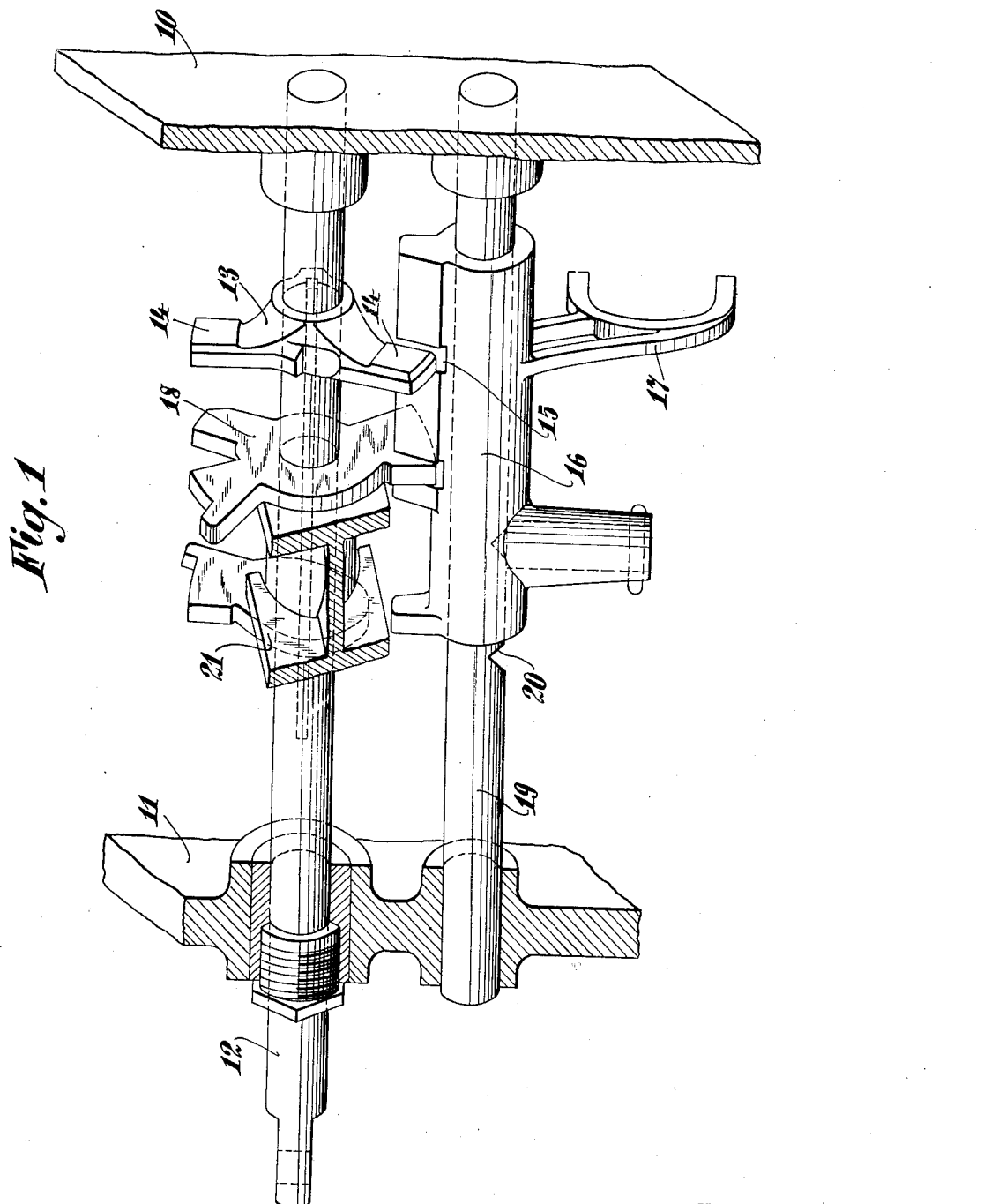
INVENTOR
*Harry Bernard,*
BY
Redding, Greeley, O'Shea & Campbell
HIS ATTORNEYS

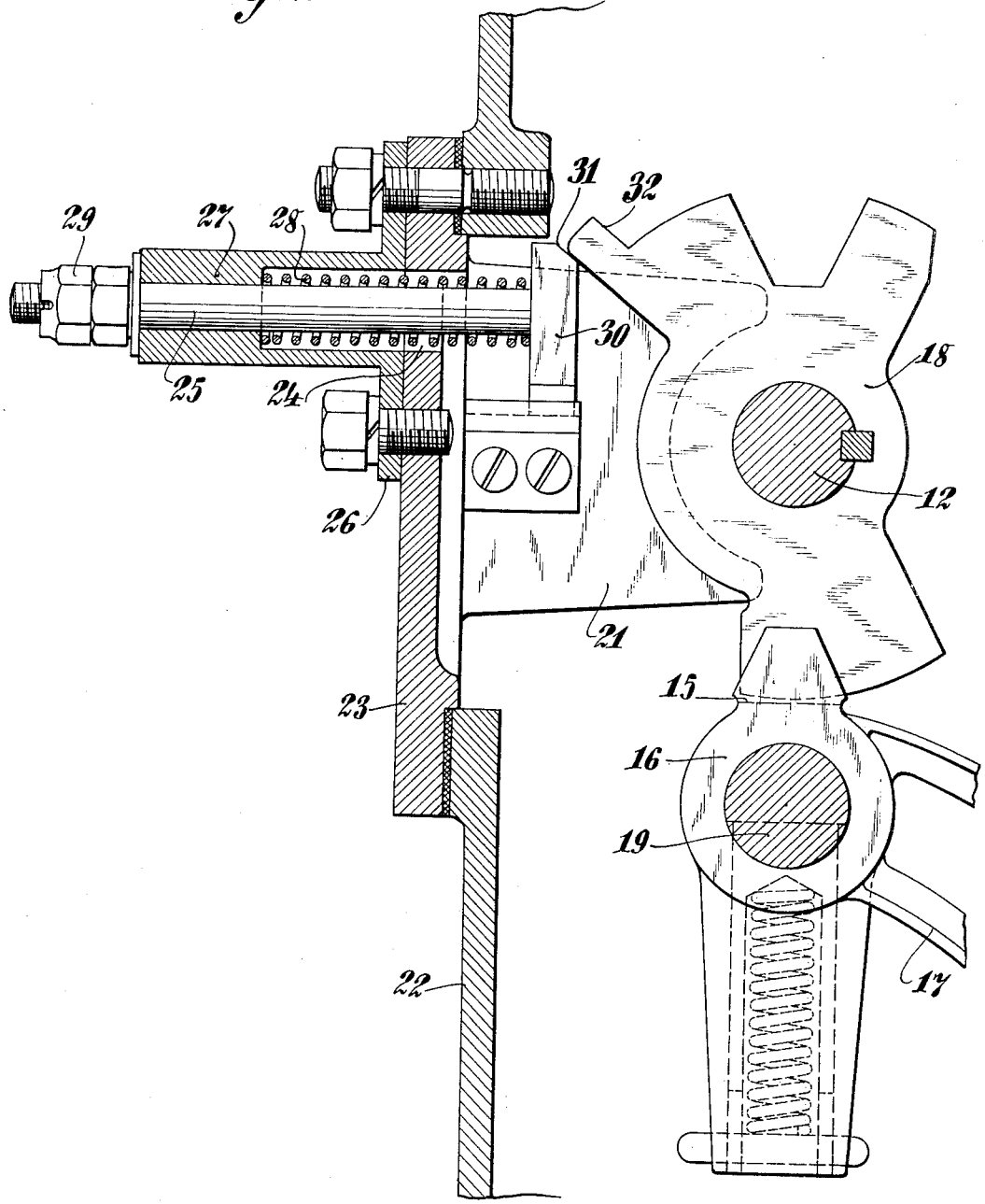

Patented Dec. 12, 1933

1,938,796

UNITED STATES PATENT OFFICE 1,938,796

GEAR SHIFTING MECHANISM FOR MOTOR VEHICLES

Harry Bernard, Allentown, Pa., assignor to International Motor Company, New York, N. Y., a corporation of Delaware Application June 10, 1932. Serial No. 616,428

2 Claims. (Cl. 74—39)

The present invention relates to shifting mechanisms for motor vehicle transmissions and embodies, more specifically, an improved locking device to prevent the shifting of the transmission mechanism accidentally into a reverse connection. In existing transmissions of special design, means has been provided for preventing such inadvertent operation of transmission mechanism, such existing means taking the form of a gate at the forward end of the control rod to limit the motion of the gear shifting lever. It is desirable to provide all of the elements which must be synchronized upon a single structure, not only that the device may be more readily manufactured and assembled but to facilitate the inspection and maintenance thereof. In order that the number and cost of the parts embodied in these mechanisms may be greatly reduced, the present invention has been designed and an object thereof is to provide a transmission mechanism within which means is provided for preventing the accidental engagement of the reverse gear connection thereof.

A further object of the invention is to provide an improved transmission reverse lock wherein, before a shift into the reverse gear connection can be made, a suitable spring mechanism must be overcome.

Further objects, not specifically enumerated above, will be apparent as the invention is described in greater detail in connection with the accompanying drawings, wherein:

Figure 1 is a view in isometric projection illustrating the shifting mechanism within a motor vehicle transmission, in combination with which the present invention acts to prevent the inadvertent manipulation of the mechanism into a reverse connection.

Figure 2 is a view in transverse section, showing the shifting mechanism of a motor vehicle transmission and the locking mechanism constructed in accordance with the present invention and adapted to cooperate with the shifting mechanism to prevent the accidental shifting of the transmission into a reverse connection.

As illustrating part of the selecting and shifting mechanism for a motor vehicle transmission, Figure 1 shows opposed walls or partitions of a transmission housing 10 and 11. Journaled and slidably mounted in walls 10 and 11 is a selector shaft 12 upon which a shifter 13 is secured, such shifter having shifting arms 14 for engaging recesses 15 in a sleeve 16 on shifter fork 17.

Upon selector shaft 12 is a shifter fork lock 18 which is adapted to engage portions of the sleeve 16 to prevent actuation thereof in a well known manner. Sleeve 16 is slidably mounted upon a shifter shaft 19 and locked in a plurality of positions indicated by notches 20 by means of a spring locking mechanism of usual form. Arms 21 extend inwardly from the transmission housing and are adapted to hold the shifter fork lock 18 in position.

Upon a side wall 22 of the transmission housing is mounted a cover plate 23 upon which the arms 21 may be formed. Plate 23 is provided with an aperture 24 through which a shaft 25 extends into the transmission housing.

The aperture 24 is covered by a plate 26 which is formed with a boss 27 in which the shaft 25 is slidably mounted. A spring 28 normally urges the shaft into the housing and nuts 29 are provided to limit the movement of shaft 25 to the right as viewed in Figure 2. Upon the end of shaft 25, a plate 30 is formed, the plate being provided with a camming surface 31 against which shoulders 32 engage when the selector shaft is rocked into a position for selecting a reverse gear connection. The rocking of the selector shaft to effect such connection is counter-clockwise as viewed in Figure 2 thus engaging the camming surface 31 on plate 30 to force the shaft 25 to the left and tension the spring 28.

A proper tension may be initially set up on spring 28 to resist the selection of a reverse connection and thus a predetermined positive force is required to effect the reverse connection for the transmission.

The foregoing structure effectively eliminates unintentional entry of the shifting arm into the sleeve of the shifting fork for actuating the reverse gear yet the construction is such as to permit intentional entry thereinto by a predetermined positive and conscious effort. By means of this construction abnormal wear on the control rod yokes, ball connections, etc., is eliminated, thus preserving the accurate alignment of the shifter forks in the transmission mechanism.

By providing the foregoing reverse lock construction, the lock plungers and stop surfaces within the transmission mechanism perform the functions for which they are basically intended and thus are relieved of additional stresses which are imposed in transmission mechanisms now available where they must perform the additional service of a reverse lock. It will be noted that while maximum resistance is offered against initial movement of the mechanism into the reverse gear position, most of the motion is made against the resistance of a comparatively light spring. This is accomplished by forming the camming surface 31 which is at a suitable angle with respect to the cooperating surface on the shoulder 32. After the camming surface 31 has been passed over by the lug or shoulder 32, the remainder of the movement into the reverse connection is resisted to a small degree only.

The advantage of the present construction will be particularly apparent in connection with four speed transmission mechanisms wherein the position of the transverse movement of the gear shift lever at three neutral points must be definitely effected. These points permit longitudinal movement of the lever into reverse, first, and second, and third and fourth gear positions, respectively. In the conventional control, the reverse gear neutral position is at the left, the first and second gear neutral position is in the center, and the third and fourth gear neutral position is at the right of the transverse movement. The extreme ends of the transverse movement, namely, the reverse and the third and fourth gear neutral positions can be definitely located by stop surfaces within the transmission housing. The centrally located first and second gear neutral positions must, however, permit movement of the mechanism in both directions. As most of the gear shifting is done in the four forward speeds, the reverse gear is usually locked out. If the locking out of the reverse gear is not positive enough, the tendency of a driver on an uphill grade, where shifting from third to second is required, is to pull the lever through the second gear neutral position into the reverse gear neutral position. This, of course, is attended by great clashing of gears especially if the driver, intending to go into second gear, actually tries to go into reverse.

From the foregoing, it will be seen that the present reverse lock mechanism is particularly effective in preventing the unintentional actuation of the reverse gear connection.

While the invention has been described with specific reference to the accompanying drawings, it is not to be limited, save as defined in the appended claims.

I claim as my invention:

1. A gear shifting mechanism for motor vehicles including gear connections for a plurality of forward speeds, a gear connection for reverse speed, means mounted rockably for selecting one of the connections, an actuating means, a plunger mounted on the mechanism and adapted to be engaged by the selecting means in selecting the reverse gear connection, a head on the plunger having cams, the selecting means engaging surfaces of which lie in intersecting planes engaged by the selecting means in the rocking movement thereof, the cam surfaces being engaged successively in the movement of the selecting means in selecting a reverse gear connection whereby the effective resistance of the cam surfaces to the movement of the selecting means varies during the continued movement thereof, and a spring to resist movement of the plunger.

2. A gear shifting mechanism for motor vehicles including gear connections for a plurality of forward speeds, a gear connection for reverse speed, means for selecting one of the connections, an actuating means, a plunger mounted on the mechanism and adapted to be engaged by the selecting means in selecting the reverse gear connection, a head on the plunger having a cam surface lying at a substantially obtuse angle with respect to the direction of motion of the selecting means and a surface lying at a substantially acute angle with respect to the direction of motion of the selecting means.

HARRY BERNARD.